(12) United States Patent
Rhinehart

(10) Patent No.: US 6,402,210 B1
(45) Date of Patent: Jun. 11, 2002

(54) ERGONOMIC DATA CARTRIDGE GRIP

(75) Inventor: James A. Rhinehart, Midland City, AL (US)

(73) Assignees: Sony Corporation (JP); Sony Electronics, Inc., Park Ridge, NJ (US)

(*) Notice: Subject to any disclaimer, the term of this patent is extended or adjusted under 35 U.S.C. 154(b) by 0 days.

(21) Appl. No.: 09/631,375

(22) Filed: Aug. 2, 2000

(51) Int. Cl.⁷ .................................................. H05K 3/00
(52) U.S. Cl. ........................................... 294/15; 29/764
(58) Field of Search ............................ 294/1.1, 15, 16, 294/116, 137; 901/39; 29/762, 764, 758

(56) References Cited

U.S. PATENT DOCUMENTS

| | | | |
|---|---|---|---|
| 3,110,960 A | * 11/1963 | Rondash | 29/764 |
| 3,137,065 A | * 6/1964 | Harris | 29/764 |
| 3,178,214 A | * 4/1965 | Tinkelenberg | 294/15 |
| 3,193,316 A | * 7/1965 | Custer | 294/15 |
| 3,484,129 A | * 12/1969 | Askren | 294/15 |
| 3,583,744 A | * 6/1971 | Paine | 294/15 |
| 3,617,083 A | * 11/1971 | Koppensteiner et al. | 294/15 |
| 3,626,575 A | * 12/1971 | Greenspan | 29/764 |
| 3,759,559 A | * 9/1973 | Yuska | 294/15 |
| 3,903,576 A | * 9/1975 | Stein | 294/15 |
| 4,723,361 A | * 2/1988 | Carlson et al. | 294/764 |
| 4,756,078 A | * 7/1988 | Dougherty et al. | 29/764 |
| 4,858,309 A | * 8/1989 | Korsunsky et al. | 294/15 |
| 5,046,237 A | * 9/1991 | Conforti et al. | 29/764 |
| 5,987,738 A | * 11/1999 | Boe | 29/764 |

* cited by examiner

Primary Examiner—Eileen D. Lillis
Assistant Examiner—Paul T. Chin
(74) Attorney, Agent, or Firm—Ronald P. Kananen; Rader, Fishman & Grauer PLLC

(57) ABSTRACT

An ergonomic cartridge grip for safely and readily inserting or removing a cartridge from a data drive unit of a PC. The cartridge grip includes an upper half and a lower half attached by screws and having an inner resilient connecting piece between the upper and lower half. The cartridge grip includes a gripping portion ergonomically designed for use with various sized hands and fingers. A shelf located opposite the gripping portion for attaching to the cartridge where a user grips the gripping portion in order to insert or extract the cartridge, which rests on the shelf, from the drive unit of the PC.

16 Claims, 3 Drawing Sheets

ERGONOMIC DATA CARTRIDGE GRIP

FIELD OF THE INVENTION

The present invention relates to data cartridges, where a cartridge grip assembly is gripped by a user and inserted onto an exposed end of a cartridge housed in an applicable opening in a PC to extract the cartridge. More specifically, the present invention relates to an ergonomic data cartridge grip having a user friendly gripping portion in which a user grabs the gripping portion of the data cartridge grip assembly thus preventing strain on hands and fingers of the users. The design is especially useful for those users who must insert and extract the often heavy and large data cartridges on a consistent basis.

BACKGROUND OF THE INVENTION

In general, insertion and removal of cartridges from data units of a PC is done manually. The user grabs the cartridge with the fingers. Insertion and removal of the cartridges which are fairly large and heavy, requires considerable strength and repeated insertion and removal may cause strain to the hand and/or fingers.

Therefore, a need exists in the art for a cartridge grip to overcome the foregoing problem. Particularly, there is a need for a cartridge grip that avoids straining the hands and/or fingers during insertion and removal of the data cartridges from the data drives of a PC.

SUMMARY OF THE INVENTION

It is an object of the present invention to meet the above-described needs and others. Specifically, it is an object of the present invention to provide a data cartridge grip assembly having an ergonomically designed gripping portion.

It is a further object that the gripping assembly aid in safety and ease of operation in inserting and removing the cartridge from the data drive, in that the ergonomic design reduces the likelihood of straining the hands and/or fingers during cartridge insertion and removal.

It is still another object to provide an ergonomic cartridge grip with a gripping portion that can either be comfortably used with a vertical data drive or a horizontal data drive.

It is still another object to provide an ergonomic cartridge grip where the thickness of the grip can be changed to accommodate varied cartridge heights.

An additional object is that, in providing an ergonomic cartridge grip being of such material, not to mar the surface of the grip, the surface of the PC, as well as to protect the cartridge itself.

Additional objects, advantages and novel features of the invention will be set forth in the description which follows or may be learned by those skilled in the art through reading these materials or practicing the invention, the objects and advantages of the invention may be achieved through means recited in the attached claims.

To achieve these stated and other objects, the present invention may be embodied and described as an ergonomic cartridge grip having an upper half and lower half held by screws and having a resilient locking feature.

A gripping portion is located opposite a cartridge shelf. When the user grips the gripping portion of the cartridge grip and inserts the cartridge shelf of the grip onto an end of the cartridge, the cartridge shelf and locking feature connect with the cartridge and the user easily inserts the cartridge into the drive or pulls the cartridge from the drive. The ergonomic nature allows for easy insertion and extraction with a force that minimizes and/or prevents strain to the hand and/or fingers of the user.

The cartridge shelf aided by the elastic locking member accepts the cartridge to be inserted or extracted. The elastic locking member acts as a locking means which includes a cam surrounded by an elastic tubing or O-ring that is positioned on either side of the shelf and connected to the upper and lower half of the grip by pins and screws. In a preferred embodiment, the O-rings allow for adjustment to the thickness of the cartridge grip, i.e., fewer O-rings allow for a thinner device. As the grip is pushed onto the cartridge, the cam wheels rotate back slightly in the direction of the gripping portion and opposite the pushing direction, thus allowing the cartridge to nest in the shelf of the cartridge in a reception end portion. When the user pulls the grip, the cam wheels rotate forward opposite the direction of pulling and towards the cartridge, thus holding the cartridge in place. In order to remove the cartridge, simply push the cartridge towards the grip which releases the cam action and allows the grip to be removed.

Further, the user may insert or remove cartridges housed in both vertical and horizontal data drive units comfortably and with ease.

Another embodiment may include the locking member which acts as a locking means having an elastic tubing surrounding the cam wheels rather than the preferred O-rings.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
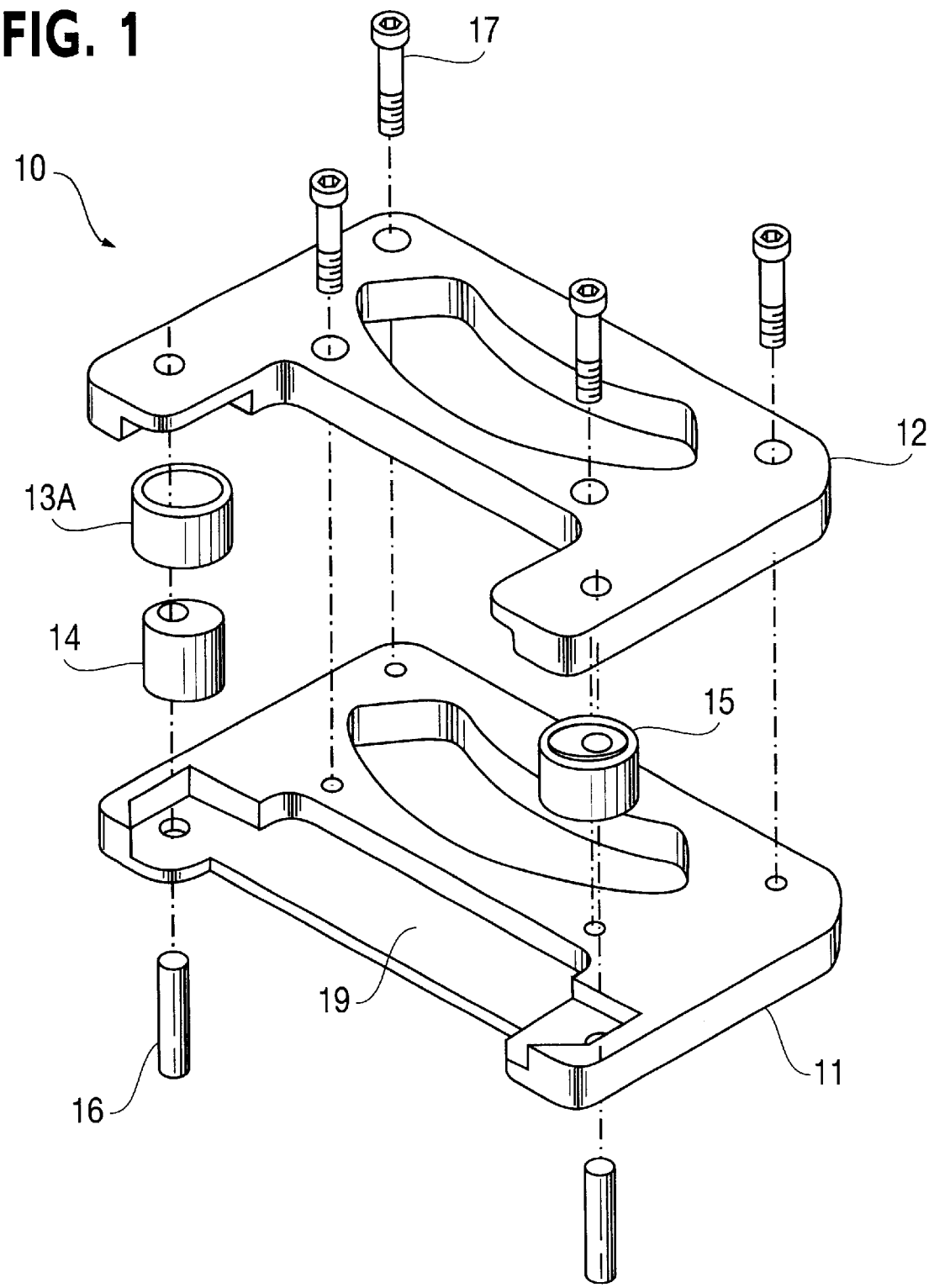
FIG. 1 is an exploded view of an ergonomic cartridge grip according to the present invention.

FIG. 1 illustrates an ergonomic cartridge grip 10. For purposes of this particular example of the present invention, the ergonomic cartridge grip 10 is for use in inserting and/or removing a data cartridge from a horizontal data drive of a PC. It will be understood by those skilled in the art that the present invention can be applied to various sized data cartridges by a simple alteration of a shelf opening space in the cartridge grip 10. A gripping portion 18A or 18B of the grip as designed can easily fit various hand sizes and defines cut-outs 22A and 22B. The cartridge grip thickness can also readily be varied by adjustment to a resilient portion (FIG. 3) of locking means 15. The present cartridge grip 10 can be used to insert and/or remove data cartridges and the like relative to the corresponding data drives.

Figure 2:
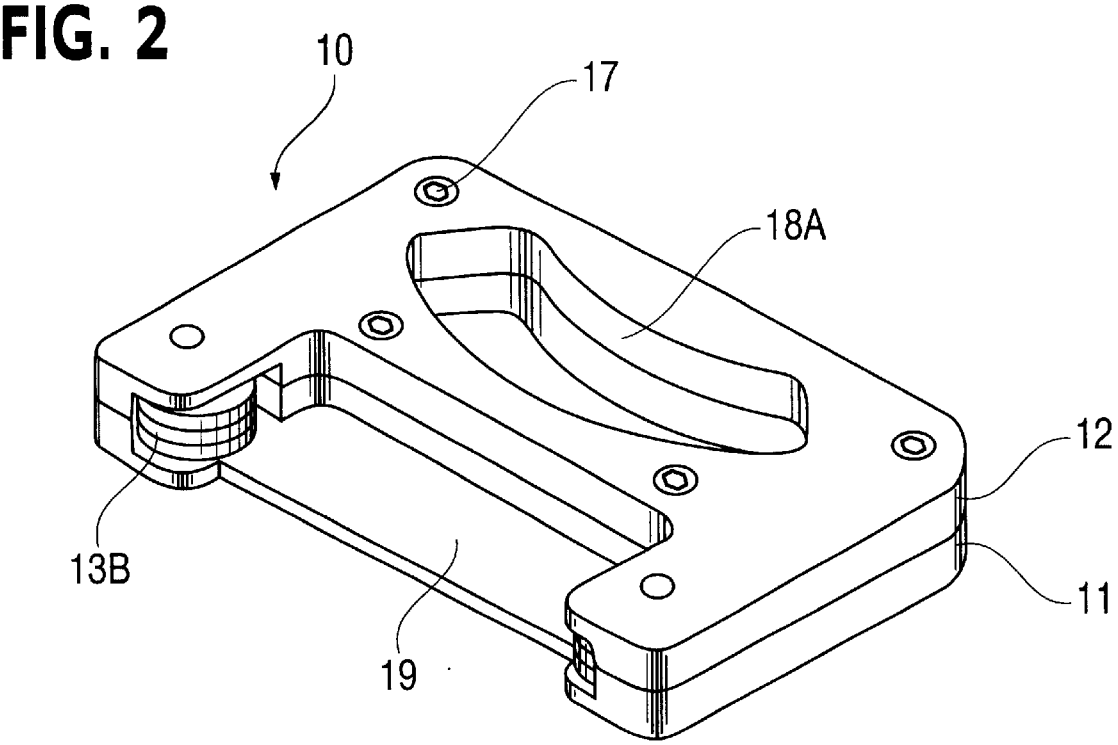
FIG. 2 is an illustration of the assembled ergonomic cartridge grip of the present invention showing a horizontal gripping portion and preferred O-rings.

The cartridge grip 10 as shown in FIG. 1 includes an upper half or portion 12 and a lower half or portion 11. The portions form a main body and are made out of a soft, non-marring material, such as but not limited to, nylon, in order to protect the cartridge, the grip, and the PC drive unit surface. The lower portion 11 includes a shelf 19 for accepting the cartridge thereon. The shelf includes a left and right recessed portion for seating the locking member 13A or 13B which acts as a resilient locking means 15. The locking means 15 includes a preferred arrangement of soft gripping O-rings 13B (FIGS. 2 and 3) surrounding cam wheels 14. Alternatively, FIG. 1 illustrates locking means 15 including the cam 14 being surrounded by an elastic member 13A. The preferred arrangement, however, includes O-rings 13B in place of the elastic tubing 13A and functions to grab the cartridge for insertion and/or removal as would the elastic tubing 13A. The O-rings allow for adjustment of the thickness of the main body. The locking means 15 rotate relative to the insertion and removal of the cartridge on the shelf 19 of the cartridge grip 10. The locking means 15 are seated on the left and right recessed portion of the shelf 19 and the main body and locking pins 16 hold the lower portion 11, the locking means 15, and the upper portion 12 in line and screws 17 fix the device 10 in place, as shown in FIG. 2. The locking pins 16 may also be a stainless steel material or the like while the screws 17 may be for example, steel socket head cap screws. The cams 14 may be made out of stainless steel material or the like.

As best seen in FIG. 2, the cartridge grip 10 includes a gripping portion 18A inside the upper portion 12 and lower portion 11, positioned at an end opposite the shelf 19. The gripping portion 18A is for insertion or extraction of a cartridge in a horizontal data drive as shown in FIGS. 1 and 2. The gripping portion 18A extends parallel to the upper and lower portions as well as to the horizontal data drive. Once assembled, as in FIG. 2, the shelf 19 includes a shelf opening with a platform extending out from the opening and further having locking means 15 on each side of the shelf 19. The locking means 15, shown as formed by a plurality of O-rings as shown in FIG. 3, are partially housed in the left and right recessed openings of the shelf 19 and main body.

In operation, the cartridge grip 10 is pushed onto an end of the cartridge. When the cartridge is placed in a drive unit of a PC, anywhere from ½" to ¾" extend from the face of the drive unit and includes a serrated grip on each side of the cartridge (not shown). As the grip 10 is pushed onto the cartridge, cams 14 rotate back slightly allowing the locking means 15 to softly grip the cartridge which nests in the grip on the shelf 19. The backward movement of the cams 14 is opposite to the pushing direction of the grip 19 and towards the gripping portion 18A. Upon gripping of the cartridge with grip 10, the user pulls the gripping portion 18A causing the cams 14 to rotate slightly forward, opposite the pulling direction and towards the drive unit, thus holding the cartridge in its grip. The more force applied during pulling makes for a tighter grip. The cartridge can then be removed quickly and with little effort. After removal of the cartridge from the data drive unit, the cartridge needs a slight push towards the grip 19 which releases the cam action and allows the cartridge to be removed and/or stored.

Figure 3:
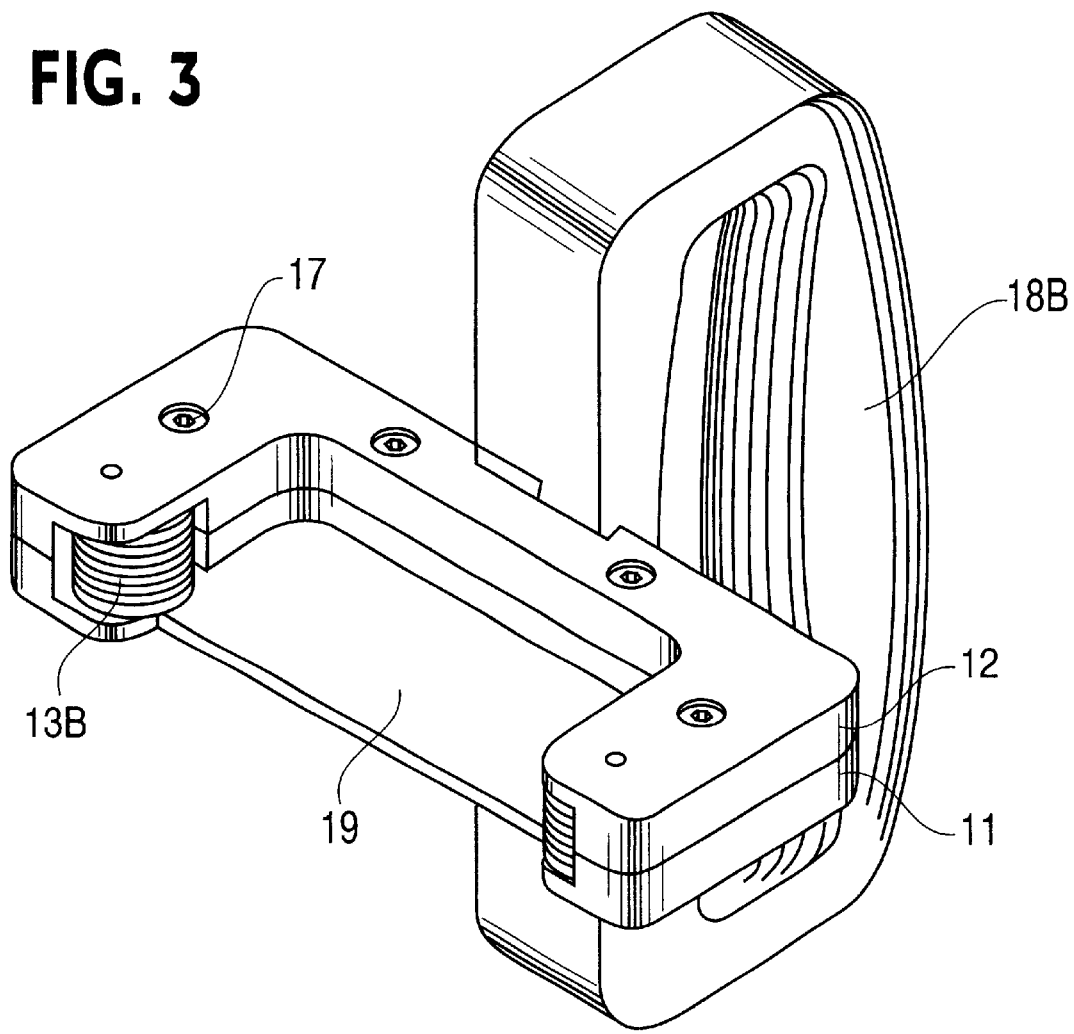
FIG. 3 is an illustration of the assembled ergonomic cartridge grip of the present invention showing a vertical gripping portion.

FIG. 3 shows the same ergonomic cartridge grip which functions as described above and includes a vertical gripping portion 18B. The cartridge grip as shown in FIG. 13 is used with data drives that extend vertically in the PC. The vertical nature of the gripping portion 18B (FIG. 3) allows for comfortable insertion and extraction of the vertically housed cartridge.

As will be appreciated by those in the art, the principles of the present invention could be applied to a number of equivalent arrangements. For example, the locking means 15 could include an elastic tubing 13A (FIGS. 1 and 2) for housing the cams 14 rather than the preferred adjustable O-ring arrangement 13B.

The preceding description has been presented only to illustrate and describe the invention. It is not intended to be exhaustive or to limit the invention to any precise form disclosed. Many modifications and variations are possible in light of the above teaching. For example, the cartridge grip in FIG. 3 could be used with the tubing member 13A shown in FIG. 1, alternatively, the grip in FIG. 1 can be used with the O-rings of FIG. 3. The later being the preferred embodiment.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A cartridge grip assembly for inserting and removing a cartridge from a data drive of a PC comprising:
    a main body having an upper panel portion and a lower panel portion, connected to one another in a facially opposing relationship and a front end portion with one of the upper and lower panel portions having a shelf integrally formed in a parallel relationship therewith for accepting the cartridge;
    a gripping portion positioned opposite said front end portion of the main body of the cartridge grip extending parallel with the upper and lower panel portions; and
    locking means positioned between the connected upper and lower panel portions for rotational engagement with an end of the cartridge.

2. The cartridge of claim 1, wherein said gripping portion includes a cut-out in the upper and lower panel portions of the main body.

3. The cartridge of claim 1, wherein the upper and lower panel portions of the main body are attached by fasteners having the locking means positioned therebetween on locking pins.

4. The cartridge of claim 3, wherein the locking means includes a pair of cams surrounded by elastic O-rings.

5. The cartridge of claim 3, wherein the locking means includes a pair of cams surrounded by elastic tubing.

6. A cartridge grip assembly for removing a cartridge from a drive unit of a PC comprising:
    a main body having an upper panel portion and a lower panel portion connected to one another in a facially opposing relationship, the main body including a shelf at a front end connected to and extending parallel with one of the upper and lower panel portions and a gripping portion at an opposite rear end; and
    locking means at said front end including a pair of cams surrounded by a pair of elastic gripping members, wherein a user grips the gripping portion and pushes the front end onto a cartridge end causing the cams to rotate toward the rear end of the main body allowing the pair of elastic gripping members to grip the cartridge on each side, the user then pulls the cartridge grip causing the cams to rotate slightly toward the drive unit, thus holding the cartridge in its grip.

7. The cartridge grip of claim 6, wherein the gripping portion extends perpendicular to the main body.

8. The cartridge grip of claim 6, wherein the gripping portion extends parallel to the main body.

9. The cartridge grip of claim 8, further comprising the gripping portion including a cut-out in the rear end of the main body.

10. The cartridge grip of claim 6, wherein the elastic gripping member includes an O-ring assembly for adjusting the thickness of the main body of the cartridge grip.

11. The cartridge grip of claim 6, wherein the elastic gripping member includes an elastic tubing.

12. The cartridge grip of claim 6, wherein a slight push on the cartridge towards the cartridge grip releases the cam action and allows the cartridge to be removed from the cartridge grip.

13. A cartridge grip apparatus for inserting and removing a cartridge from a data drive of a computer, the cartridge grip apparatus comprising:

a main body having a first panel portion and a second panel portion connectable to each other in a facially opposing relationship, the first panel portion having a generally C-shaped configuration to define a forwardly-opening cartridge-receiving channel, the second panel portion having a forwardly-projecting shelf facing the cartridge-receiving channel when the first and second panel members are connected together;

a pair of locking devices sandwiched between the connected first and second panel portions and disposed opposite one another and laterally of the cartridge-receiving channel and the shelf; and a grip member positioned rearwardly of the cartridge-receiving channel and the shelf.

14. A cartridge grip apparatus according to claim 13, wherein the grip member is formed by a cut-out extending through the connected first and second panel portions and disposed rearwardly of the cartridge-receiving channel and the shelf.

15. A cartridge grip apparatus according to claim 13, wherein the grip member is a handle connected perpendicularly to the connected first and second panel portions and disposed rearwardly of the cartridge-receiving channel and the shelf.

16. A cartridge grip apparatus according to claim 13, wherein each one of the pair of locking devices is a cam rotatably mounted between the connected first and second panel portions and surrounded by one of a plurality of resilient O-rings and an elastic tubing.

* * * * *